United States Patent
Li (10) Patent No.: US 11,641,595 B2
(45) Date of Patent: May 2, 2023

(54) METHOD AND APPARATUS FOR DETERMINING CHANNEL OCCUPANCY INFORMATION

(71) Applicant: BEIJING XIAOMI MOBILE SOFTWARE CO., LTD., Beijing (CN)

(72) Inventor: Mingju Li, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 32 days.

(21) Appl. No.: 17/267,716

(22) PCT Filed: Aug. 17, 2018

(86) PCT No.: PCT/CN2018/101159
§ 371 (c)(1),
(2) Date: Feb. 10, 2021

(87) PCT Pub. No.: WO2020/034214
PCT Pub. Date: Feb. 20, 2020

(65) Prior Publication Data
US 2021/0315007 A1    Oct. 7, 2021

(51) Int. Cl.
*H04B 7/0408* (2017.01)
*H04B 17/318* (2015.01)
(Continued)

(52) U.S. Cl.
CPC .......... *H04W 24/10* (2013.01); *H04B 7/0408* (2013.01); *H04B 17/318* (2015.01);
(Continued)

(58) Field of Classification Search
CPC ... H04B 7/02–12; H04B 17/0082–3913; H04J 11/0023–0093;
(Continued)

(56) References Cited

U.S. PATENT DOCUMENTS

| | | | |
|---|---|---|---|
| 2020/0052803 A1* | 2/2020 | Deenoo | H04W 48/12 |
| 2020/0092911 A1* | 3/2020 | Li | H04W 74/006 |
| 2021/0297170 A1* | 9/2021 | Niu | H04W 24/10 |

FOREIGN PATENT DOCUMENTS

| | | |
|---|---|---|
| CN | 107820259 A | 3/2018 |
| CN | 107889114 A | 4/2018 |

(Continued)

OTHER PUBLICATIONS

International Search Report to PCT/CN2018/101159 dated May 5, 2019 with English translation, (4p).

*Primary Examiner* — Timothy J Weidner
(74) *Attorney, Agent, or Firm* — Arch & Lake LLP (57) ABSTRACT

A method and apparatus for determining channel occupancy information is provided. The user device determines a measured object according to first indication information sent by a base station, determines a target beam corresponding to the measured object according to a pre-stored correspondence relationship between a plurality of measured objects and a plurality of beams, measures first strength information of a received signal on the target beam, determines the channel occupancy information according to the first strength information, and sends the channel occupancy information to the base station. The channel occupancy information is marked as being associated with the measured object.

13 Claims, 9 Drawing Sheets

(51) Int. Cl.
*H04W 16/28* (2009.01)
*H04W 24/10* (2009.01)
*H04W 56/00* (2009.01)
*H04W 72/04* (2023.01)
*H04W 74/08* (2009.01)
*H04W 84/02* (2009.01)
*H04W 88/02* (2009.01)
*H04W 88/08* (2009.01)
*H04W 92/02* (2009.01)
*H04W 92/10* (2009.01)
*H04W 72/044* (2023.01)

(52) U.S. Cl.
CPC ......... *H04W 16/28* (2013.01); *H04W 56/001* (2013.01); *H04W 72/046* (2013.01); *H04W 74/0808* (2013.01); *H04W 84/02* (2013.01); *H04W 88/02* (2013.01); *H04W 88/08* (2013.01); *H04W 92/02* (2013.01); *H04W 92/10* (2013.01)

(58) Field of Classification Search
CPC .... H04J 2011/003–0096; H04L 5/0001–0098; H04W 8/22–245; H04W 16/28; H04W 24/02–10; H04W 28/02–26; H04W 36/0005–385; H04W 48/02–20; H04W 56/0005–0095; H04W 72/005–14; H04W 74/002–0891; H04W 84/005–22; H04W 88/005–188; H04W 92/02; H04W 92/04; H04W 92/10
See application file for complete search history.

(56) References Cited

FOREIGN PATENT DOCUMENTS

| | | |
|---|---|---|
| CN | 107911826 A | 4/2018 |
| CN | 107919929 A | 4/2018 |
| WO | 2017126935 A1 | 7/2017 |

\* cited by examiner

METHOD AND APPARATUS FOR DETERMINING CHANNEL OCCUPANCY INFORMATION

CROSS-REFERENCE TO RELATED APPLICATION

This application is the US national application of International Application No. PCT/CN2018/101159, filed on Aug. 17, 2018, the entire contents of which are incorporated herein by reference for all purposes.

TECHNICAL FIELD

The present disclosure relates to the communication technology field, and more particularly, to a method for determining channel occupancy information, an apparatus for determining channel occupancy information, an electronic device, and a computer-readable storage medium.

BACKGROUND

In order to expand the frequency bands that may be used in the communication, the LAA (license assisted access) technology have been proposed in the related art, in which unlicensed spectrums are configured for auxiliary access. As the unlicensed spectrums are required for usage, in order to avoid conflicts with the devices that are using unlicensed spectrum, it is necessary to determine whether channels for the unlicensed spectrums are idle for example through an LBT (listen before talk). The unlicensed spectrums may be used for communication transmission when the channels are idle.

However, when the communication is performed based on the NR (new radio) technology, signal reception and transmission are carried out on the beams, and the method for determining whether the channels for the unlicensed spectrums are idle in the related art is not well applicable to the NR technology.

SUMMARY

According to a first aspect of the present disclosure, there is provided a method for determining channel occupancy information. The method includes that a user device determines a measured object according to first indication information sent by a base station. The method also includes that the user device determines a target beam corresponding to the measured object according to a pre-stored correspondence relationship between a plurality of measured objects and a plurality of beams. The plurality of measured objects include the measured object. The method further includes that the user device measures first strength information of a received signal on the target beam and the user device determines the channel occupancy information according to the first strength information. Moreover, the method includes that the user device sends the channel occupancy information to the base station and the channel occupancy information is marked as being associated with the measured object.

According to a second aspect of the present disclosure, there is provided a method for determining channel occupancy information. The method includes that a base station sends first indication information to a user device. The first indication information is configured to indicate a measured object, such that the user device measures first strength information of a received signal on a target beam corresponding to the measured object and determines channel occupancy information according to the first strength information. The method further includes that the base station receives the channel occupancy information and the measured object associated with the channel occupancy information sent by the user device.

According to a third aspect of the present disclosure, there is provided an electronic device. The electronic device includes a processor and a memory for storing instructions executable by the processor. The processor is configured to determine a measured object according to first indication information sent by a base station and determine a target beam corresponding to the measured object according to a pre-stored correspondence relationship between a plurality of measured objects and a plurality of beams. The processor is further configured to measure first strength information of a received signal on the target beam, determine the channel occupancy information according to the first strength information, and send the channel occupancy information to the base station. The channel occupancy information is marked as being associated with the measured object.

BRIEF DESCRIPTION OF THE DRAWINGS

In order to explain the technical solutions in the embodiments of the application more clearly, the accompanying drawings that are needed in the description of the embodiments will be briefly introduced below. Obviously, the accompanying drawings in the following description are only some embodiments of the application. For those skilled in the art, other drawings may be obtained based on these drawings without creative labor.

DETAILED DESCRIPTION

The technical solutions in the embodiments of the application will be described clearly and completely in conjunction with the accompanying drawings in the embodiments of the application. Obviously, the described embodiments are only a part of the embodiments of the application, rather than all the embodiments. Based on the embodiments in the application, all other embodiments obtained by those skilled in the art without creative work shall fall within the protection scope of the application.

Figure 1:
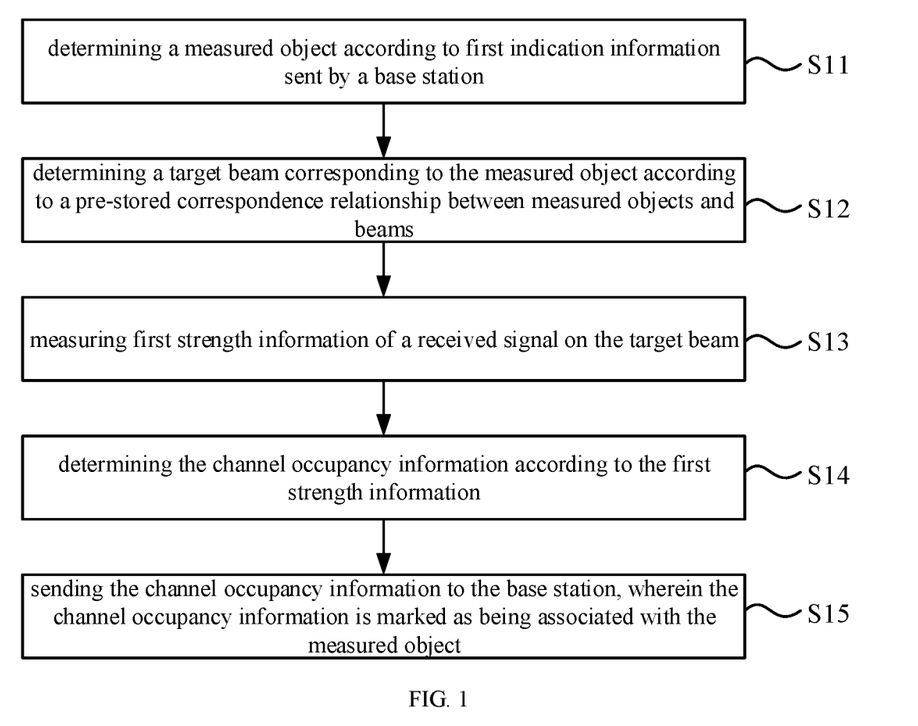
FIG. 1 is a schematic flowchart illustrating a method for determining channel occupancy information according to embodiments of the disclosure.

FIG. 1 is a schematic flowchart illustrating a method for determining channel occupancy information according to embodiments of the disclosure. The method for determining channel occupancy information illustrated in this embodiment may be applied to a user device that may be a mobile phone, a tablet computer, a wearable device, etc. The user device may communicate with a base station, for example based on the NR technology.

As illustrated in FIG. 1, the method for determining channel occupancy information may include the following steps.

In step S11, the measured object is determined according to first indication information sent by a base station.

In one embodiment, the base station may send first indication information that may carry a measured object to a user device, where there is a correspondence relationship between measured objects and beams. For example, the measured object may be an index of a synchronization signal block (shortened as SSB) and may also be an identifier of a channel state information reference signal (shortened as CSI-RS), where the CSI-RS may be a CSI-RS with an NZP (Non-Zero Power).

The base station may only send the index of the synchronization signal block to the user device or only send the identifier of the channel state information reference signal to the user device, and may also send both the index of the synchronization signal block and the identifier of the channel state information reference signal to the user device. The specific content sent to the user device as the measured object may be configured as required.

In addition, the first indication information sent by the base station and the way of sending the first indication information may be different for user devices in different states.

For example, for a user device in an idle state, there are no communication connections between the user device and the base station, so the base station may send the first indication information by broadcasting, where the measured object carried by the first indication information may be the index of the synchronization signal block or the identifier of the channel state information reference signal.

For example, for a user device in a connected state, there are communication connections between the user device and the base station, so the base station may send the first indication information to the user device in a targeted manner. For example, the first indication information may be sent in a radio resource control (shortened as RRC) message, where the measured object carried by the first indication information may be the identifier of the channel state information reference signal or the index of the synchronization signal block.

In step S12, a target beam corresponding to the measured object is determined according to a pre-stored correspondence relationship between measured objects and beams.

In one embodiment, there is a correspondence relationship between measured objects and beams, and the user device may pre-store the correspondence relationship, where one measured object may correspond to one beam or a plurality of beams.

In step S13, first strength information of a received signal on the target beam is measured.

In one embodiment, the strength information may be an RSRP (reference signal received power), an RSRQ (reference signal received quality), or an RSSI (received signal strength indicator). It may be selected as required whether the RSRP, the RSRQ or the RSSI is measured.

For example, when the RSSI is selected in measuring the channel occupancy information, the measurement may be performed when the base station does not send signals. The received signals mainly refer to interference signals within an angle corresponding to the target beam.

In step S14, channel occupancy information is determined according to the first strength information.

In one embodiment, the user device may transmit strength information measured for one time as the channel occupancy information to the base station, or transmit pieces of strength information measured for a plurality of times as the channel occupancy information to the base station. The pieces of strength information measured for a plurality of times may be further processed, for example, the pieces of strength information measured for a plurality of times are compared with a preset threshold, in which the strength information greater than the preset threshold is determined, and a ratio of a number of pieces of strength information greater than the preset threshold to a number of the plurality of pieces of strength information is calculated as the channel occupancy information.

In step S15, the channel occupancy information is sent to the base station, where the channel occupancy information is marked as being associated with the measured object.

According to the embodiments of the disclosure, the channel occupancy information may be determined on the beam corresponding to the measured object indicated by the base station, and the channel occupancy information sent to the base station is marked as being associated with the measured object. When the channel occupancy information is received by the base station, the beam where the channel occupancy information measured by a user device is located may be determined according to the measured object associated with the channel occupancy information, so that the base station determines a channel condition of the channels corresponding to the beam on this basis, thereby facilitating the base station in reasonably scheduling the channels on the beam for the user device and keeping away from directions corresponding to beams with relatively large interference, so as to increase data throughput of the user device.

It should be noted that the embodiments of the disclosure may be applied to the LAA or NR unlicensed spectrum technology. For example when performing the LBT, it is determined whether the channels for the unlicensed spectrums on the target beam are idle according to channel occupancy information. Of course, the embodiments described in the disclosure may also be applied to other scenarios as needed.

Figure 2:
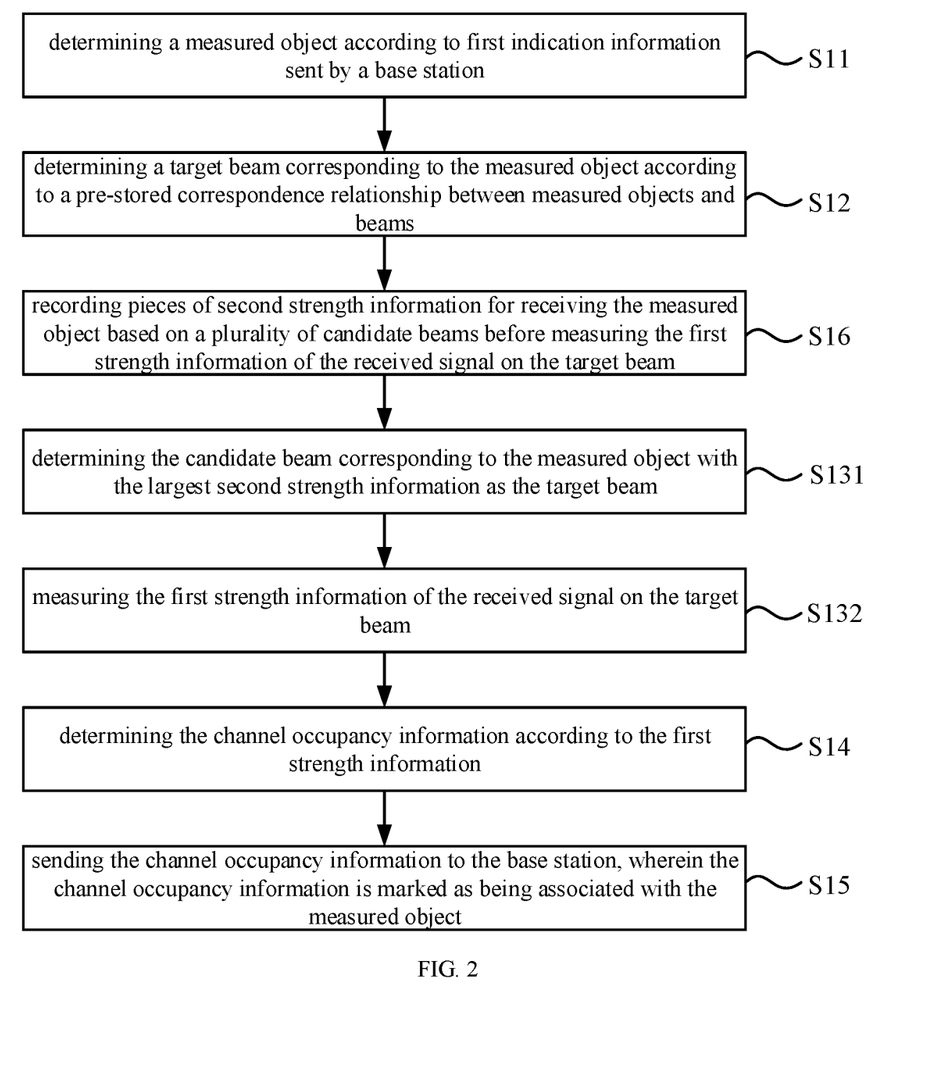
FIG. 2 is a schematic flowchart illustrating another method for determining channel occupancy information according to embodiments of the disclosure.

FIG. 2 is a schematic flowchart illustrating another method for determining channel occupancy information according to embodiments of the disclosure. As illustrated in FIG. 2, based on the embodiment illustrated in FIG. 1, the method further includes the following steps.

In step S16, pieces of second strength information for receiving the measured object are recorded based on a plurality of candidate beams before measuring the first strength information of the received signal on the target beam; in this case, one measured object may correspond to a plurality of candidate beams. That is, the measured object may be received on the plurality of candidate beams. In step S12, a plurality of beams may be thus determined as candidate beams according to the received measured object.

Measuring the first strength information of the received signal on the target beam includes the steps S131 and S132.

In step S131, the candidate beam corresponding to the measured object with the largest second strength information is determined as the target beam.

In step S132, the first strength information of the received signal on the target beam is measured.

In one embodiment, before measuring the first strength information of the received signal on the target beam, the user device may receive the measured object on a plurality of candidate beams, and record pieces of the second strength information for the received measured object. The first signal strength and the second signal strength may be different parameters. For example, the first signal strength is the RSSI while the second signal strength is the RSRP or RSRQ. The first signal strength and the second signal strength may be the same parameter, for example both are the RSRP.

In one embodiment, when measuring the second strength information, the base station may send a specified measured object at specified time. Taking as an example that the measured object is a synchronization signal block, the user device receives the synchronization signal block with the plurality of candidate beams at the specified time. When the RSRP or RSRQ of the synchronization signal block measured with a certain beam is the highest, it means that the channel condition for receiving the synchronization signal block is optimal when the user device uses the receiving beam, and the beam is determined as the target beam corresponding to the synchronization signal block. In order to perform channel detection, the first strength information is measured. That is, it is determined whether there are other devices on the target beam corresponding to the synchronization signal block that occupy the unlicensed spectrum corresponding to the detected channel, since the base station does not transmit the synchronization signal block at this time and the user device mainly detects the energy of signals sent by other devices. Thus, the RSSI is measured as the first strength information. When the RSSI is higher than a threshold, it indicates that other devices nearby are using the unlicensed spectrum, and the ratio of the number of RSSIs higher than the threshold to the total number of detected RSSIs may be determined as the channel occupancy information.

By determining and recording the pieces of second strength information for receiving the measured object on a plurality of candidate beams, the measured object corresponding to the largest second strength information may be determined. The received signal strength of user device is the highest on the candidate beam corresponding to the measured object. The candidate beam corresponding to the measured object is thus determined as the target beam, and the first strength information of the received signal is measured on the target beam, so that the base station may receive the channel occupancy information determined by the user device on the beam with the highest received signal strength. Therefore, the base station may perform channels scheduling based on the beam with the highest received signal strength from the user device, so that the user device may receive the signals in the channel on the beam with the highest received signal strength, ensuring the communication quality of the user device to the greatest extent.

Figure 3:
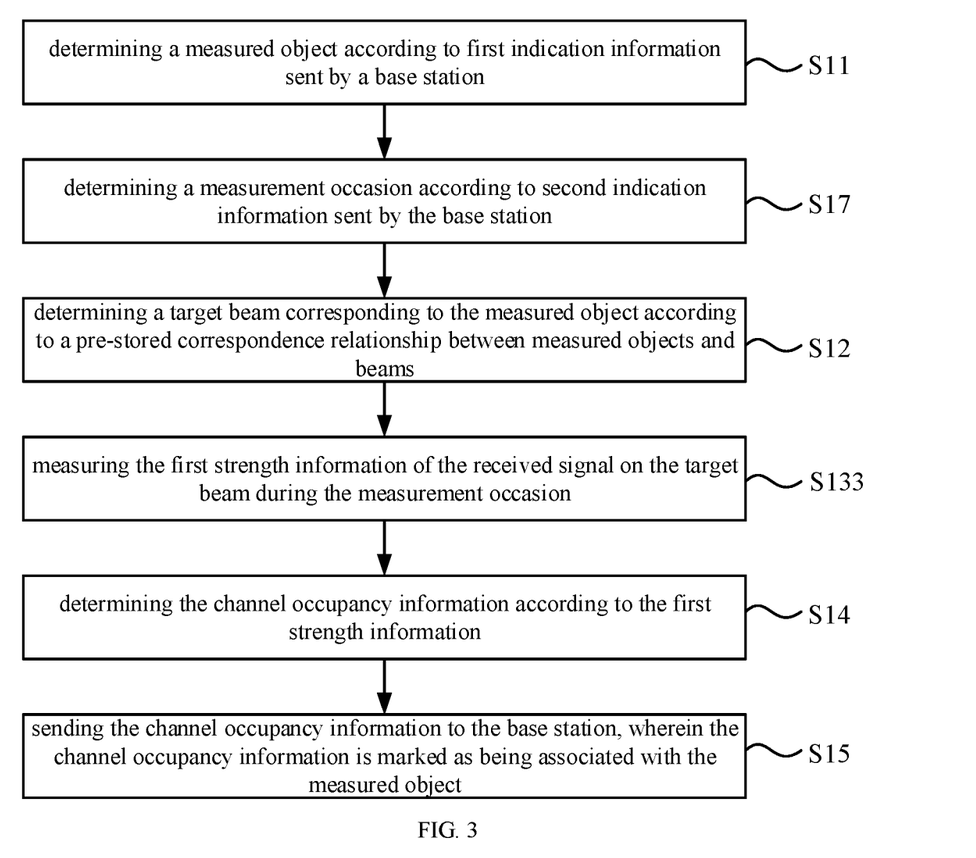
FIG. 3 is a schematic flowchart illustrating another method for determining channel occupancy information according to embodiments of the disclosure.

FIG. 3 is a schematic flowchart illustrating another method for determining channel occupancy information according to embodiments of the disclosure. As illustrated in FIG. 3, based on the embodiment illustrated in FIG. 1, the method further includes the following steps.

In step S17, a measurement occasion is determined according to second indication information sent by the base station before measuring the first strength information of the received signal on the target beam; the step S17 may be executed after step S11 as illustrated in FIG. 3, and the execution order of step S17 may be adjusted as needed, for example, may be executed before step S11 or simultaneously with step S11.

Measuring the first strength information of the received signal on the target beam include the following step.

In step S133, the first strength information of the received signal is measured on the target beam during the measurement occasion.

In one embodiment, the base station may indicate the measurement occasion to the user device through the second indication information, so that the user device may measure the first strength information of the received signal on the target beam during the measurement occasion, where the measurement occasion may be a period of time for which the user device measures the first strength information of the received signal on the target beam. Accordingly, it is possible to prevent the user device from excessively measuring the first strength information of the received signal on the target beam and waste the resources of the user device.

Figure 4:
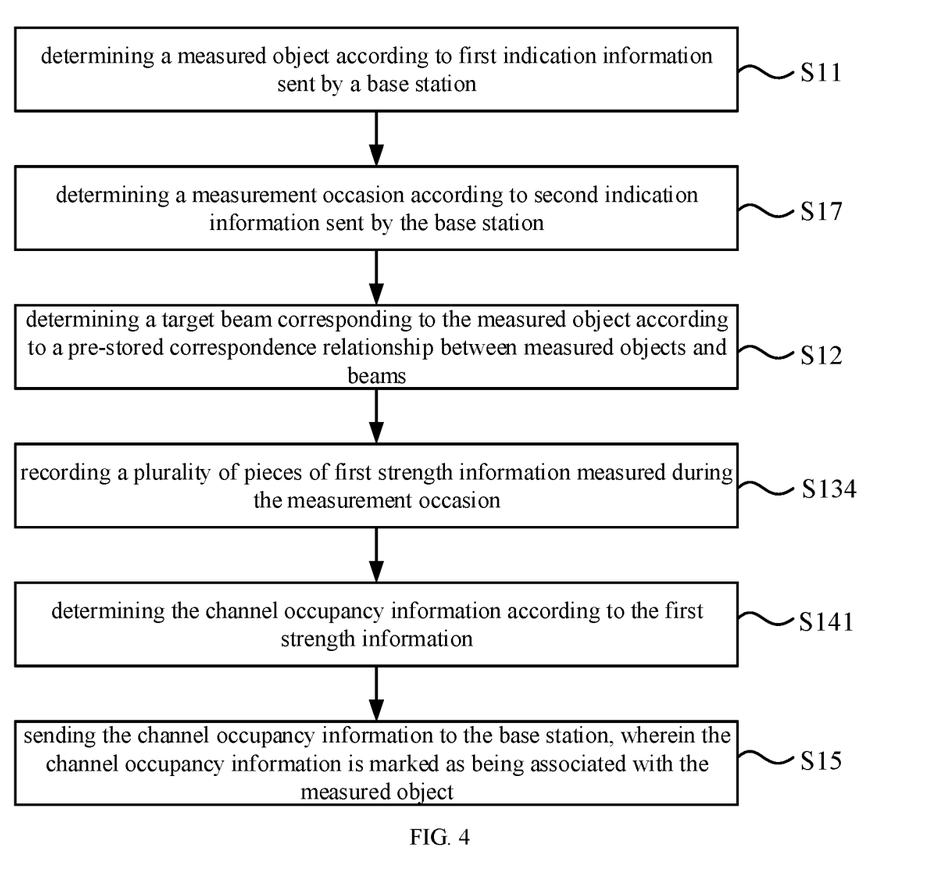
FIG. 4 is a schematic flowchart illustrating another method for determining channel occupancy information according to embodiments of the disclosure.

FIG. 4 is a schematic flowchart illustrating another method for determining channel occupancy information according to embodiments of the disclosure. As illustrated in FIG. 4, based on the embodiment illustrated in FIG. 1, measuring the first strength information of the received signal on the target beam further includes the following step.

In step S134, a plurality of pieces of first strength information measured during the measurement occasion are recorded.

determining the channel occupancy information according to the first strength information includes step S141.

In step S141, a ratio of a number of pieces of first strength information in the plurality of pieces of first strength information that is greater than a preset threshold to a number of the plurality of pieces of first strength information is calculated as the channel occupancy information.

In one embodiment, the user device may measure the first strength information of the received signal for a plurality of times on the target beam during the measurement occasion. For example, N pieces of first strength information are measured and each piece of first strength information measured is compared with a preset threshold. For example, if there are M pieces of first strength information greater than the preset threshold in the N pieces of first strength information, a ratio of M/N may be calculated as the channel occupancy information and transmitted to the base station.

Since the channel state may be changed, the measurement result cannot accurately reflect the channel occupancy condition in case that the channel occupancy information is determined only based on the first strength information that is measured for one time. However, the number ratio is calculated based on the measurement results for a plurality of times which may better reflect the situation where the channels are occupied. Therefore, the base station may be allowed to more accurately determine the situation where the channels are occupied by using the number ratio as the channel occupancy information.

Alternatively, the measured object includes at least one of the following items.

The items are an index of a synchronization signal block and an identifier of a channel state information reference signal.

Figure 5:
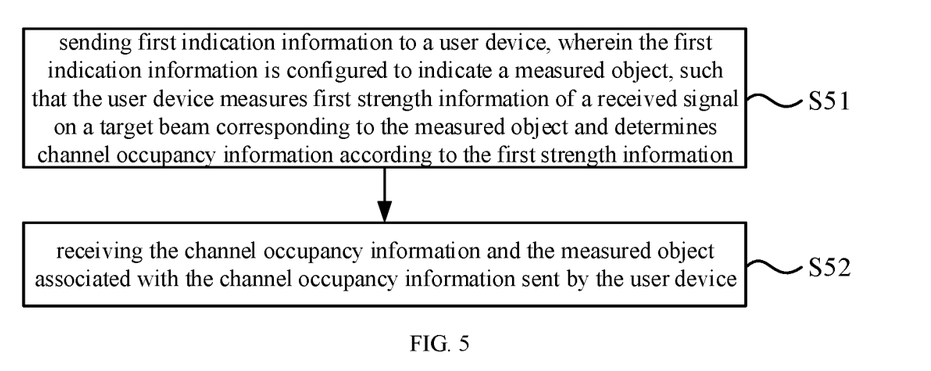
FIG. 5 is a schematic flowchart illustrating yet another method for determining channel occupancy information according to embodiments of the disclosure.

FIG. 5 is a schematic flowchart illustrating yet another method for determining channel occupancy information according to embodiments of the disclosure. The method for determining channel occupancy information illustrated in this embodiment may be applied to a base station that may communicate with a user device, for example based on the NR technology. The user device may be a mobile phone, a tablet computer, a wearable device, etc.

As illustrated in FIG. 5, the method for determining channel occupancy information may include the following steps.

In step S51, first indication information is sent to the user device, where the first indication information is configured to indicate a measured object, such that the user device measures a received signal on a target beam corresponding to the measured object and determines channel occupancy information according to the first strength information.

In step S52, the channel occupancy information and the measured object associated with the channel occupancy information sent by the user device are received.

According to the embodiments of the disclosure, the base station may indicate the measured object to the user device, so that the channel occupancy information is determined on the beam corresponding to the measured object indicated by the user device, and the channel occupancy information sent to the base station is marked as being associated with the measured object. When the channel occupancy information is received by the base station, the beam where the channel occupancy information measured by the user device is located may be determined according to the measured object associated with the channel occupancy information, so that so that the base station determines a channel condition for the channels corresponding to the beam on this basis, thereby facilitating the base station in reasonably scheduling the channels on the beam for the user device and keeping away from directions corresponding to beams with relatively large interference, so as to increase data throughput of the user device.

Figure 6:
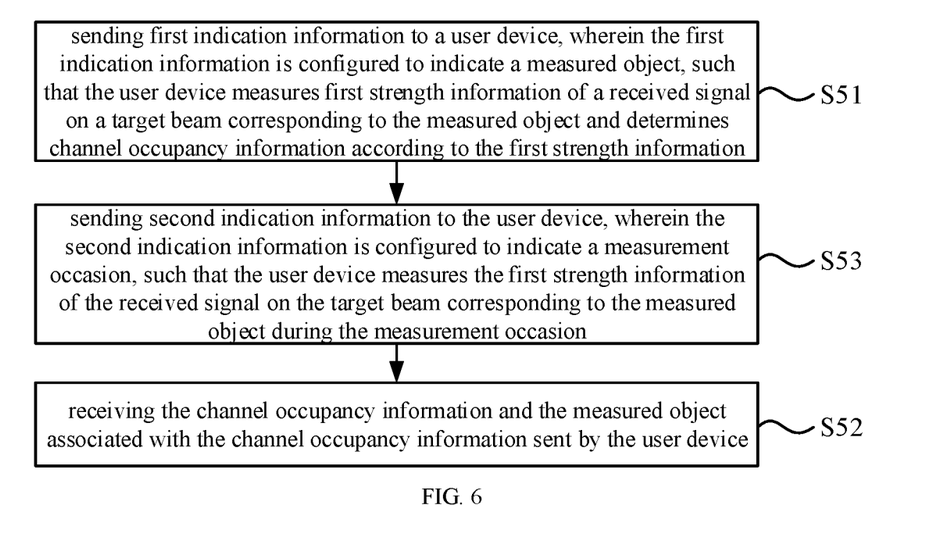
FIG. 6 is a schematic flowchart illustrating yet another method for determining channel occupancy information according to embodiments of the disclosure.

FIG. 6 is a schematic flowchart illustrating yet another method for determining channel occupancy information according to embodiments of the disclosure. As illustrated in FIG. 6, based on the embodiment illustrated in FIG. 5, the method further includes the following step.

In step S53, second indication information is sent to the user device before receiving the channel occupancy information and the measured object associated with the channel occupancy information sent by the user device, where the second indication information is configured to indicate a measurement occasion, such that the user device measures the first strength information of the received signal on the target beam corresponding to the measured object during the measurement occasion.

In one embodiment, the base station may indicate the measurement occasion to the user device through the second indication information, so that the user device may measure the first strength information of the received signal on the target beam during the measurement occasion, where the measurement occasion may be a period of time for which the user device measures the first strength information of the received signal on the target beam. Accordingly, it is possible to prevent the user device from excessively measuring the first strength information of the received signal on the target beam and waste the resources of the user device.

Alternatively, the measured object includes at least one of the following items.

The items are an index of a synchronization signal block and an identifier of a channel state information reference signal.

Corresponding to the preceding embodiments of the method for determining channel occupancy information, the disclosure also provides embodiments of an apparatus for determining channel occupancy information.

Figure 7:
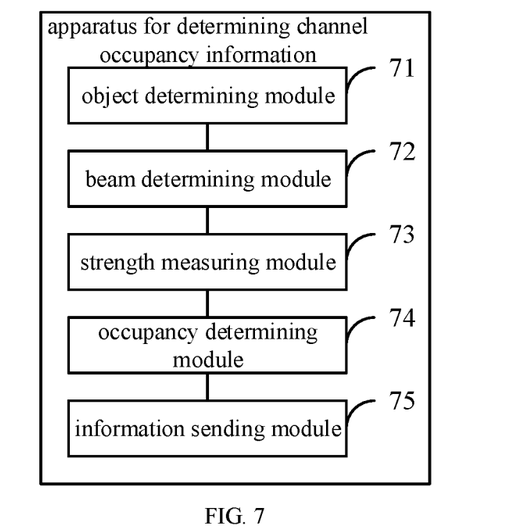
FIG. 7 is a schematic block diagram illustrating an apparatus for determining channel occupancy information according to embodiments of the disclosure.

FIG. 7 is a schematic block diagram illustrating an apparatus for determining channel occupancy information according to embodiments of the disclosure. The apparatus for determining channel occupancy information illustrated in this embodiment may be applied to a user device that may be a mobile phone, a tablet computer, a wearable device, etc. The user device may communicate with a base station, for example based on the NR technology.

As illustrated in FIG. 7, the apparatus for determining channel occupancy information may include an object determining module 71, a beam determining module 72, a strength measuring module 73, an occupancy determining module 74, and an information sending module 75.

The object determining module 71 is configured to determine a measured object according to first indication information sent by a base station.

The beam determining module 72 is configured to determine a target beam corresponding to the measured object according to a pre-stored correspondence relationship between measured objects and beams.

The strength measuring module 73 is configured to measure first strength information of the received signal on the target beam.

The occupancy determining module 74 is configured to determine channel occupancy information according to the first strength information.

The information sending module 75 is configured to send the channel occupancy information to the base station, where the channel occupancy information is marked as being associated with the measured object.

Figure 8:
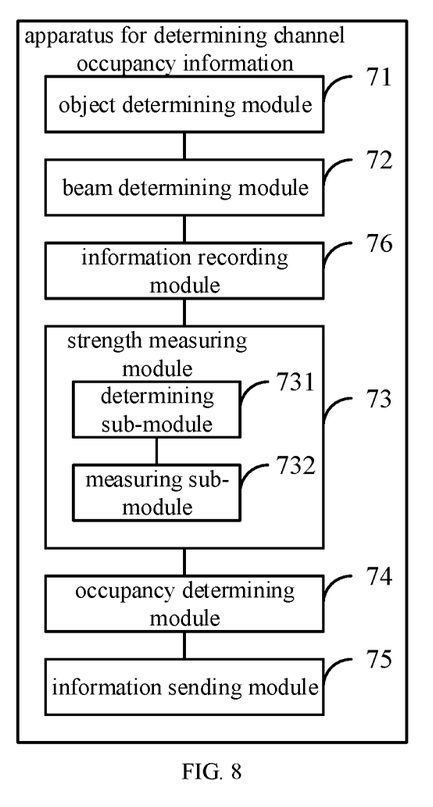
FIG. 8 is a schematic block diagram illustrating another apparatus for determining channel occupancy information according to embodiments of the disclosure.

FIG. 8 is a schematic block diagram illustrating another apparatus for determining channel occupancy information according to embodiments of the disclosure. As illustrated in FIG. 8, based on the embodiment illustrated in FIG. 7, the apparatus further includes an information recording module 76.

The information recording module 76 is configured to record pieces of second strength information for receiving the measured object based on a plurality of candidate beams;

The strength measuring module 73 includes a determining sub-module 731 and a measuring sub-module 732.

The determining sub-module 731 is configured to determine the candidate beam corresponding to the measured object with the largest second strength information as the target beam.

The measuring sub-module 732 is configured to measure the first strength information of the received signal on the target beam.

Figure 9:
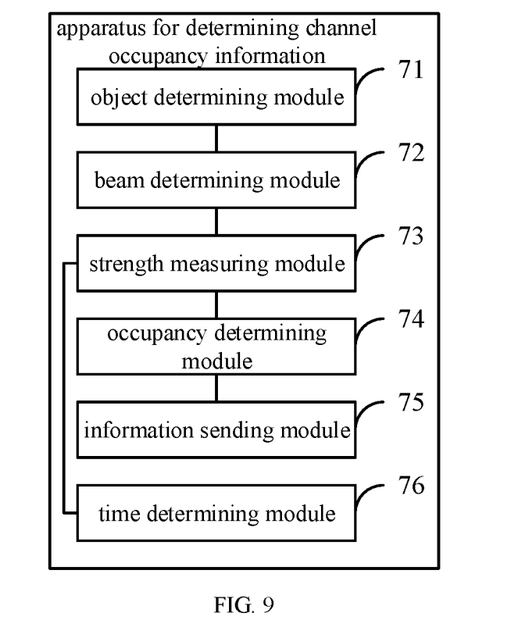
FIG. 9 is a schematic block diagram illustrating another apparatus for determining channel occupancy information according to embodiments of the disclosure.

FIG. 9 is a schematic block diagram illustrating another apparatus for determining channel occupancy information according to embodiments of the disclosure. As illustrated in FIG. 9, based on the embodiment illustrated in FIG. 7, the apparatus further includes a time determining module 77.

The time determining module 77 is configured to determine a measurement occasion according to second indication information sent by the base station.

The strength measuring module 73 is configured to measure the first strength information of the received signal on the target beam during the measurement occasion.

Alternatively, the strength measuring module is configured to record a plurality of pieces of first strength information measured during the measurement occasion.

The occupancy determining module is configured to calculate a ratio of a number of pieces of first strength information in the plurality of pieces of first strength information that is greater than a preset threshold to a number of the plurality of pieces of first strength information as the channel occupancy information.

Alternatively, the measured object includes at least one of the following items.

The items are an index of a synchronization signal block and an identifier of a channel state information reference signal.

Figure 10:
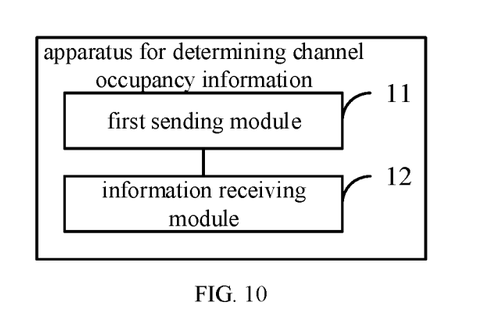
FIG. 10 is a schematic block diagram illustrating another apparatus for determining channel occupancy information according to embodiments of the disclosure.

FIG. 10 is a schematic block diagram illustrating another apparatus for determining channel occupancy information according to embodiments of the disclosure. The apparatus for determining channel occupancy information illustrated in this embodiment may be applied to a base station that may communicate with a user device, for example based on the NR technology. The user device may be a mobile phone, a tablet computer, a wearable device, etc.

As illustrated in FIG. 10, the apparatus for determining channel occupancy information may include a first sending module 11 and an information receiving module 12.

The first sending module 11 is configured to send first indication information to a user device, where the first indication information is configured to indicate a measured object, such that the user device measures first strength information of a received signal on a target beam corresponding to the measured object and determine channel occupancy information according to the first strength information.

The information receiving module 12 is configured to receive the channel occupancy information and the measured object associated with the channel occupancy information sent by the user device.

Figure 11:
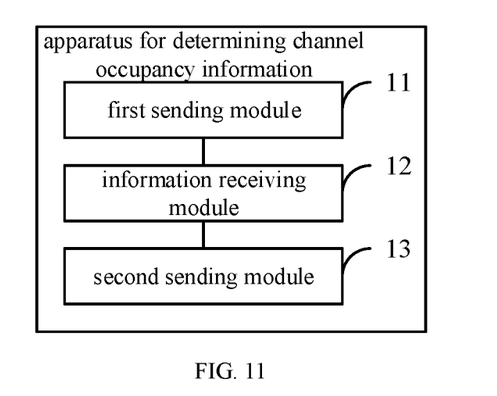
FIG. 11 is a schematic block diagram illustrating another apparatus for determining channel occupancy information according to embodiments of the disclosure.

FIG. 11 is a schematic block diagram illustrating another apparatus for determining channel occupancy information according to embodiments of the disclosure. As illustrated in FIG. 11, based on the embodiment illustrated in FIG. 10, the apparatus further includes a second sending module 13.

The second sending module 13 is configured to send second indication information to the user device, where the second indication information is configured to indicate a measurement occasion, such that the user device measures the first strength information of the received signal on the target beam corresponding to the measured object during the measurement occasion.

Alternatively, the measured object includes at least one of the following items.

The items are an index of a synchronization signal block and an identifier of a channel state information reference signal.

Regarding the apparatus in the above embodiments, the specific implementations in which each module performs operation have been described in detail in the related method embodiments, which will not be elaborated herein.

As for the apparatus embodiments, since they basically correspond to the method embodiments, the relevant parts may refer to parts of the descriptions of the method embodiments. The apparatus embodiments described above are merely illustrative. The units described as separate components may or may not be physically separated, and the components displayed as units may or may not be physical units, that is, they may be located in one place or may be distributed to a plurality of network units. Some or all of the modules may be selected according to actual needs to achieve the objectives of the solutions of the embodiments. Those skilled in the art may understand and implement them without creative work.

According to embodiments of the disclosure, there is also provided an electronic device, including:

a processor; and a memory for storing instructions executable by the processor.

The processor is configured to implement the steps in the method described in any of the above embodiments.

According to embodiments of the disclosure, there is also provided a computer-readable storage medium having a computer program stored thereon. When the program is executed by a processor, the steps in the method described in any of the above embodiments are implemented.

Figure 12:
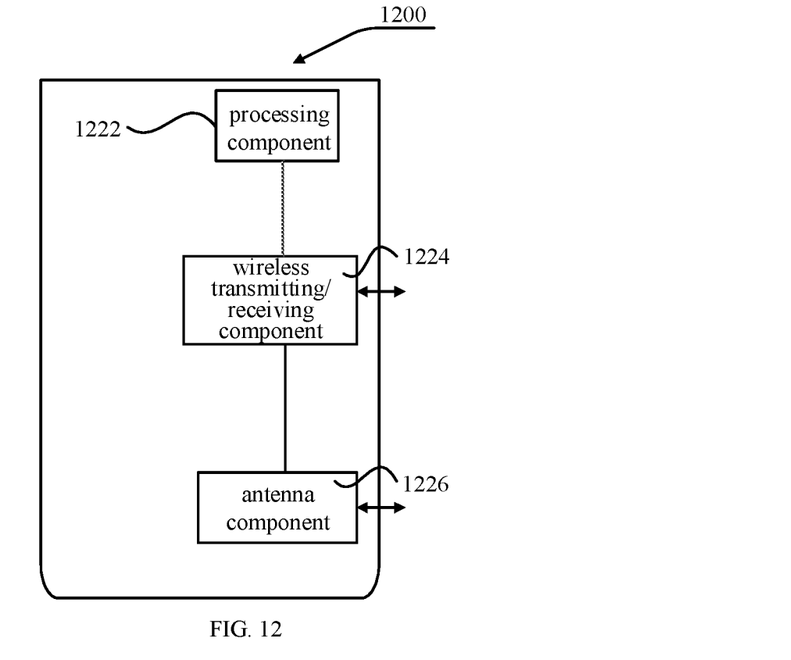
FIG. 12 is a structural schematic diagram of a device for determining channel occupancy information according to embodiments of the disclosure.

As illustrated in FIG. 12, FIG. 12 is a structural schematic diagram of a device 1200 for determining channel occupancy information according to embodiments of the disclosure. The device 1200 may be provided as a base station. The device 1200 includes a processing component 1222, a wireless transmitting/receiving component 1224, an antenna component 1226, and signal processing parts specific to a wireless interface. The processing component 1222 may further include one or more processors. One of the processors in the processing component 1222 may be configured to implement the steps in the method described in any one of the above embodiments.

Figure 13:
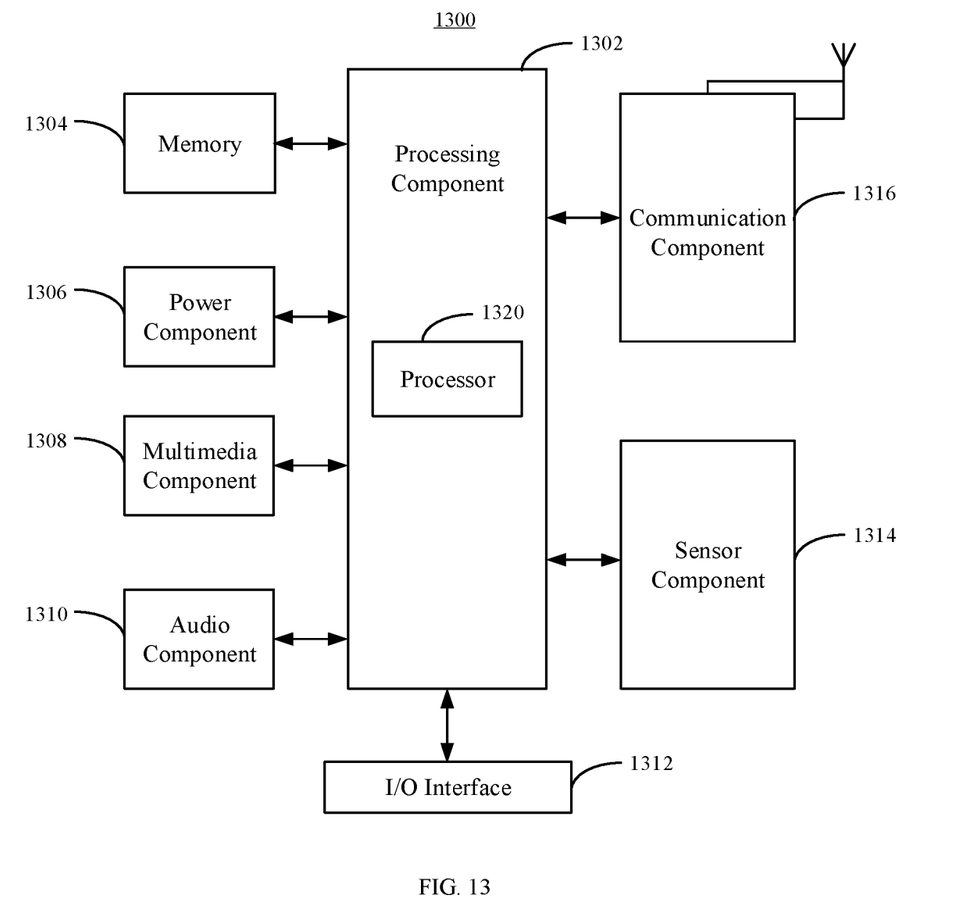
FIG. 13 is a schematic block diagram illustrating a device for determining channel occupancy information according to an exemplary embodiment.

FIG. 13 is a schematic block diagram illustrating a device 1300 for determining channel occupancy information according to an exemplary embodiment. For example, the device 1300 may be a mobile phone, a computer, a digital broadcasting terminal, a messaging device, a game console, a tablet device, a medical device, a fitness device, a personal digital assistant, etc.

Referring to FIG. 13, the device 1300 may include one or more of the following components: a processing component 1302, a memory 1304, a power supply component 1306, a multimedia component 1308, an audio component 1310, an input/output (I/O) interface 1312, a sensor component 1314, and a communication component 1316.

The processing component 1302 typically controls overall operations of the device 1300, such as the operations associated with display, telephone calls, data communications, camera operations, and recording operations. The processing component 1302 may include one or more processors 1320 to execute instructions to perform all or part of the steps of the above described methods. Moreover, the processing component 1302 may include one or more modules which facilitate the interaction between the processing component 1302 and other components. For example, the processing component 1302 may include a multimedia module to facilitate the interaction between the multimedia component 1308 and the processing component 1302.

The memory 1304 is configured to store various types of data to support operations of the device 1300. Examples of such data include instructions for any application or method operated on the device 1300, contact data, phone book data, messages, pictures, videos, etc. The memory 1304 may be implemented using any type of volatile or non-volatile memory device or a combination thereof, such as a static random access memory (SRAM), an electrically erasable programmable read-only memory (EEPROM), an erasable programmable read only memory (EPROM), a programmable read only memory (PROM), a read only memory (ROM), a magnetic memory, a flash memory, a magnetic or optical disk.

The power supply component 1306 provides power to various components of the device 1300. The power supply component 1306 may include a power management system, one or more power sources, and other components associated with the generation, management, and distribution of power in the device 1300.

The multimedia component 1308 includes a screen providing an output interface between the device 1300 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of the touch or slide action, but also sense a period of time and a pressure associated with the touch or swipe action. In some embodiments, the multimedia component 1308 includes a front camera and/or a rear camera. The front camera and the rear camera may receive an external multimedia datum while the device 1300 is in an operation mode, such as a photographing mode or a video mode. Each of the front camera and rear camera may be a fixed optical lens system or have focus and optical zoom capability.

The audio component 1310 is configured to output and/or input audio signals. For example, the audio component 1310 includes a microphone (MIC) configured to receive an external audio signal when the device 1300 is in an operation mode, such as a call mode, a recording mode, and a voice recognition mode. The received audio signal may be further stored in the memory 1304 or transmitted via the communication component 1316. In some embodiments, the audio component 1310 further includes a speaker to output audio signals.

The I/O interface 1312 provides an interface between the processing component 1302 and peripheral interface modules. The peripheral interface modules may be a keyboard, a click wheel, a button, and the like. These buttons may include but are not limited to, a home button, a volume button, a starting button, and a locking button.

The sensor component 1314 includes one or more sensors to provide status assessments of various aspects of the device 1300. For example, the sensor component 1314 may detect an open/closed status of the device 1300, relative positioning of components, e.g., the display and the keypad, of the device 1300, a change in position of the device 1300 or a component of the device 1300, a presence or absence of user contact with the device 1300, an orientation or an acceleration/deceleration of the device 1300, and a change in temperature of the device 1300. The sensor component 1314 may include a proximity sensor configured to detect the presence of nearby objects without any physical contact. The sensor component 1314 may also include a light sensor, such as a CMOS or CCD image sensor, for use in imaging applications. In some embodiments, the sensor component 1314 may also include an accelerometer sensor, a gyroscope sensor, a magnetic sensor, a pressure sensor, or a temperature sensor.

The communication component 1316 is configured to facilitate communication, wired or wirelessly, between the device 1300 and other devices. The device 1300 can access a wireless network based on a communication standard, such as WiFi, 2G, or 3G, or a combination thereof. In one exemplary embodiment, the communication component 1316 receives a broadcast signal or broadcast associated information from an external broadcast management system via a broadcast channel. In one exemplary embodiment, the communication component 1316 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 1300 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 1304, executable by the processor 1320 in the device 1300, for performing the above-described methods. For example, the non-transitory computer-readable storage medium may be a ROM, a RAM, a CD-ROM, a magnetic tape, a floppy disc, an optical data storage device, and the like.

Other embodiments of the invention will be apparent to those skilled in the art from consideration of the specification and practice of the invention disclosed here. This application is intended to cover any variations, uses, or adaptive changes of the disclosure following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

It should be noted that in this text, the relational terms (first, second, etc.) are only used to distinguish one entity or operation from another entity or operation, and do not necessarily require or imply that there is any such actual relationship or order between these entities or operations. The terms "comprise", "include" or any other variants thereof are intended to cover non-exclusive inclusion, so that a process, method, article or device including a series of elements not only includes those elements, but also includes other elements not explicitly listed, or also includes elements inherent to such process, method, article, or device. If there are no more restrictions, the element defined by the sentence "including a . . . " does not exclude the existence of other same elements in the process, method, article, or device that includes the element.

The methods and apparatuses according to the embodiments of the disclosure are described in detail above. Specific examples are used in this text to illustrate the principles and implementations of the invention. The descriptions of the above embodiments are only used to help understand the methods and core concept of the invention. At the same time, there will be changes in the specific implementation and application range for those skilled in the art according to the concept of the invention. In summary, the content of the specification should not be construed as limitations to the disclosure.

What is claimed is:

1. A method for determining channel occupancy information, comprising:
   determining, by a user device, a measured object according to first indication information sent by a base station, wherein the measured object comprises at least one of a synchronization signal block and a channel state information reference signal;
   determining, by the user device, a target beam corresponding to the measured object according to a pre-stored correspondence relationship between a plurality of measured objects and a plurality of beams, wherein the plurality of measured objects comprise the measured object;
   measuring, by the user device, first strength information of a received signal on the target beam;
   determining, by the user device, the channel occupancy information according to the first strength information; and
   sending, by the user device, the channel occupancy information to the base station, wherein the channel occupancy information is marked as being associated with the measured object;
   wherein determining the target beam corresponding to the measured object comprises:
   receiving the measured object on one or more beams, wherein the measured object corresponds to one or more beams;
   in response to the measured object corresponding to beams, recording a plurality of pieces of second strength information for receiving the measured object based on the beams, and determining a beam with a largest second strength information as the target beam.

2. The method of claim 1, further comprising:
   determining, by the user device, a measurement occasion according to second indication information sent by the base station before measuring the first strength information of the received signal on the target beam;
   wherein measuring, by the user device, the first strength information of the received signal on the target beam comprises:
   measuring, by the user device, the first strength information of the received signal on the target beam during the measurement occasion.

3. The method of claim 2, wherein measuring, by the user device, the first strength information of the received signal on the target beam further comprises:
   recording, by the user device, a plurality of pieces of first strength information measured during the measurement occasion;
   wherein determining, by the user device, the channel occupancy information according to the first strength information comprises:

calculating, by the user device, a ratio of a number of pieces of first strength information in the plurality of pieces of first strength information greater than a preset threshold to a number of the plurality of pieces of first strength information as the channel occupancy information.

4. The method of claim 1, wherein the measured object comprises at least one of following parameters:
   an index of a synchronization signal block and an identifier of a channel state information reference signal.

5. A non-transitory computer readable storage medium storing a plurality of programs for execution by an electronic device having one or more processors, wherein the plurality of programs, when executed by the one or more processors, cause the electronic device to perform the method of claim 1.

6. A method for determining channel occupancy information, comprising:
   sending, by a base station, first indication information to a user device, wherein the first indication information is configured to indicate a measured object, such that the user device measures first strength information of a received signal on a target beam corresponding to the measured object and determines channel occupancy information according to the first strength information; and
   receiving, by the base station, the channel occupancy information and the measured object associated with the channel occupancy information sent by the user device;
   wherein the measured object comprises at least one of a synchronization signal block and a channel state information reference signal; and
   the target beam corresponding to the measured object is determined by:
   receiving the measured object on one or more beams, wherein the measured object corresponds to one or more beams;
   in response to the measured object corresponding to beams, recording a plurality of pieces of second strength information for receiving the measured object based on the beams, and determining a beam with a largest second strength information as the target beam.

7. The method of claim 6, further comprising:
   sending, by the base station, second indication information to the user device before receiving the channel occupancy information and the measured object associated with the channel occupancy information sent by the user device, wherein the second indication information is configured to indicate a measurement occasion, such that the user device measures the first strength information of the received signal on the target beam corresponding to the measured object during the measurement occasion.

8. The method of claim 6, wherein the measured object comprises at least one of following parameters:
   an index of a synchronization signal block and an identifier of a channel state information reference signal.

9. A base station, comprising:
   a processor; and
   a memory for storing instructions executable by the processor;
   wherein the processor is configured to implement the steps in the method of claim 6 by executing the instructions stored in the memory.

10. An electronic device, comprising:
    a processor; and a memory for storing instructions executable by the processor;

wherein the processor is configured to:

determine a measured object according to first indication information sent by a base station, wherein the measured object comprises at least one of a synchronization signal block and a channel state information reference signal;

determine a target beam corresponding to the measured object according to a pre-stored correspondence relationship between a plurality of measured objects and a plurality of beams, wherein the plurality of measured objects comprise the measured object;

measure first strength information of a received signal on the target beam;

determine the channel occupancy information according to the first strength information; and send the channel occupancy information to the base station, wherein the channel occupancy information is marked as being associated with the measured object;

wherein the target beam corresponding to the measured object is determined by:

receiving the measured object on one or more beams, wherein the measured object corresponds to one or more beams;

in response to the measured object corresponding to beams, recording a plurality of pieces of second strength information for receiving the measured object based on the beams, and determining a beam with a largest second strength information as the target beam.

11. The electronic device of claim 10, wherein the processor is further configured to:

determine a measurement occasion according to second indication information sent by the base station before measuring the first strength information of the signal received on the target beam; and measure the first strength information of the received signal on the target beam during the measurement occasion.

12. The electronic device of claim 11, wherein the processor is further configured to:

record a plurality of pieces of first strength information measured during the measurement occasion; and calculate a ratio of a number of pieces of first strength information in the plurality of pieces of first strength information greater than a preset threshold to a number of the plurality of pieces of first strength information as the channel occupancy information.

13. The electronic device of claim 10, wherein the measured object comprises at least one of following parameters:

an index of a synchronization signal block and an identifier of a channel state information reference signal.

* * * * *